Feb. 2, 1954 F. CARTLIDGE 2,668,039
COMBINED CUTTING AND LOADING MACHINE
Filed Aug. 26, 1949 3 Sheets-Sheet 1
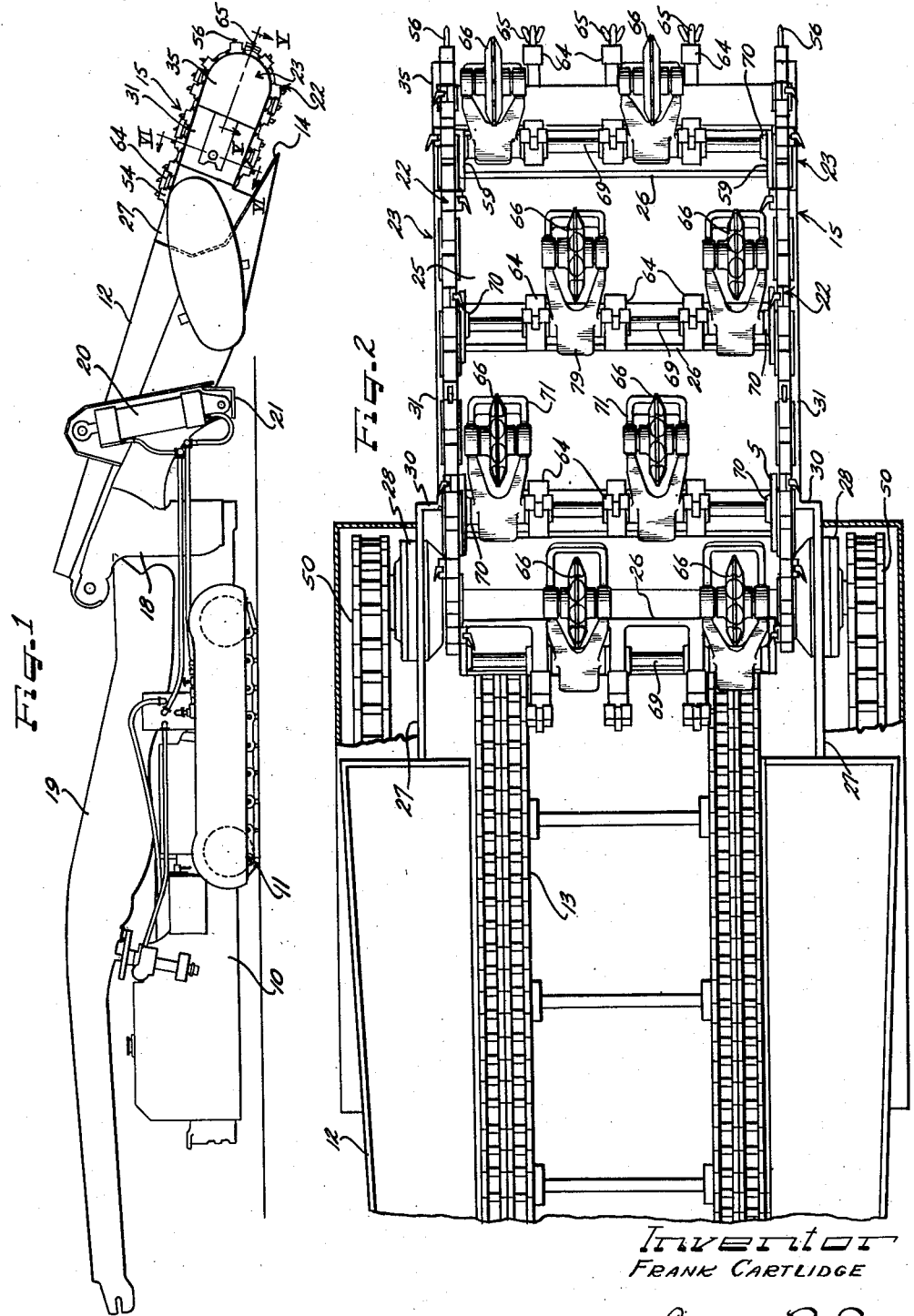
Inventor
FRANK CARTLIDGE
Clarence J. Poole
Atty.

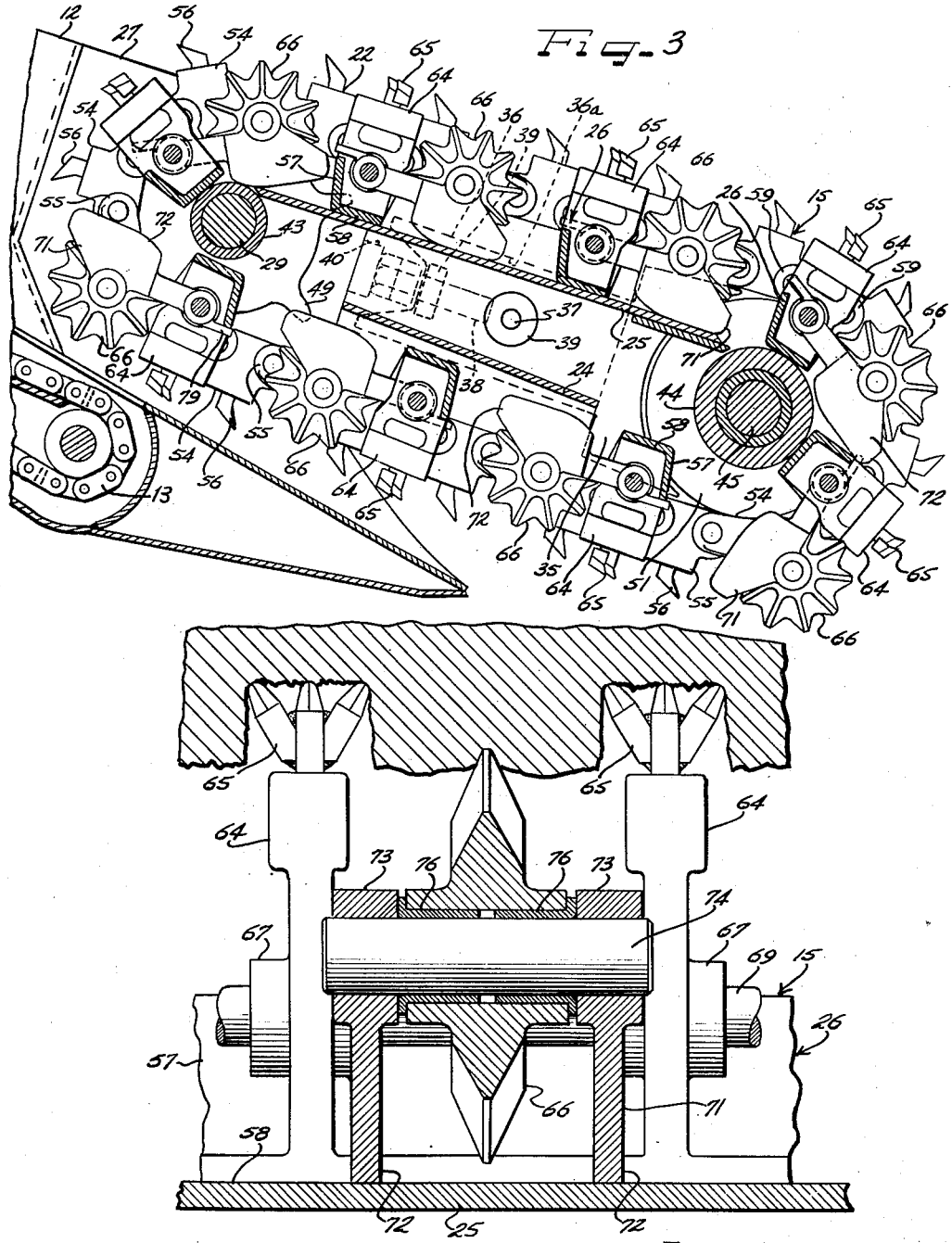

Feb. 2, 1954   F. CARTLIDGE   2,668,039
COMBINED CUTTING AND LOADING MACHINE
Filed Aug. 26, 1949   3 Sheets-Sheet 3

Inventor
FRANK CARTLIDGE
Clarence F. Poole
Atty.

Patented Feb. 2, 1954

2,668,039

UNITED STATES PATENT OFFICE 2,668,039

COMBINED CUTTING AND LOADING MACHINE

Frank Cartlidge, Chicago, Ill., assignor to Goodman Manufacturing Company, Chicago, Ill., a corporation of Illinois Application August 26, 1949, Serial No. 112,500

10 Claims. (Cl. 262—9)

This invention relates to improvements in cutting and loading machines, and more particularly to a cutting and loading element for such machines adapted to cut and load material such as coal or the like from a solid mine wall.

Heretofore, various forms of continuous cutting and loading machines have been used to cut and load coal from a solid coal face. The most successful of these machines have used a plurality of parallel spaced vertically arranged cutter chain carrying cutter bars mounted to operate to cut swaths of coal from the solid coal face during vertical movement of the cutter bars about a horizontal axis. While such machines have successfully cut and loaded coal from the solid, in order to do this without consuming an excessive amount of power, the cutter chains have been spaced so closely together that a large percentage of the coal obtained is in the nature of fine coal with a resultant large loss of coal as it passes through the washer and difficulty in marketing the fine coal not so lost.

It has been attempted to space the cutter bars farther apart in order to increase the percentage of coarse coal, but when this is done the cores between the cutter bars obstruct feeding movement thereof, resulting in excessive power consumption and overloading of the machine and even at times stopping the cutting and loading operation entirely until the cores have been broken down.

The device of my present invention has as its principal object to overcome these difficulties by providing a cutting and loading element of a novel and efficient construction arranged to cut a plurality of kerfs spaced a relatively wide distance apart and leaving a plurality of cores therebetween, and penetrating the cores and wedging them into the kerfs along the cleavage planes of the coal.

Another object of my invention is to provide a new and improved form of cutting and loading element adapted to continuously cut and load coal from the solid, including a pair of parallel spaced orbitally guided cutter chains movable vertically as a unit and having a conveying means therebetween with core breaker means arranged to engage the cores between the kerfs cut by the cutter chains and wedge and break them along the cleavage planes of the coal.

A further and more specific object of my invention is to provide a simplified form of cutting and loading element adapted for the continuous cutting and loading of coal from the solid, including a plurality of spaced-apart kerf cutters and rotatable breaker wheels movable therewith into engagement with the cores left between the kerfs cut by the kerf cutters to continuously wedge apart and break down the coal therein.

A still further object of my invention is to provide a new and improved form of cutting and loading element adapted for the continuous cutting and loading of material such as coal from a solid mine face, including a pair of parallel spaced cutter chains guided for orbital movement in vertical planes, with flights connecting the chains together and having cutting means projecting therefrom to cut parallel kerfs in the space between the cutter chains, and also having rotatable core breakers carried thereby and arranged to penetrate and wedge apart and break down the cores left between the kerfs cut by the kerf cutters to be carried away by the flights.

My present invention is an improvement in the invention disclosed in my Patent No. 2,287,230, granted June 23, 1942.

These and other objects of my invention will more clearly appear from time to time as the following specification proceeds and with reference to the accompanying drawings wherein:

Figure 1 is a view in side elevation of a cutting and loading machine having a cutting element constructed in accordance with my invention embodied therein;

Figure 2 is an enlarged detail fragmentary plan view of the forward end view of the cutting and loading machine shown in Figure 1 with certain parts thereof broken away and certain other parts shown in horizontal section;

Figure 3 is an enlarged view in substantially longitudinal section taken through the cutting and loading element;

Figure 4 is a fragmentary sectional view taken through one of the breaker wheels between two kerf cutters and showing the relation of the kerf cutters and core breaker during cutting;

Figure 5:
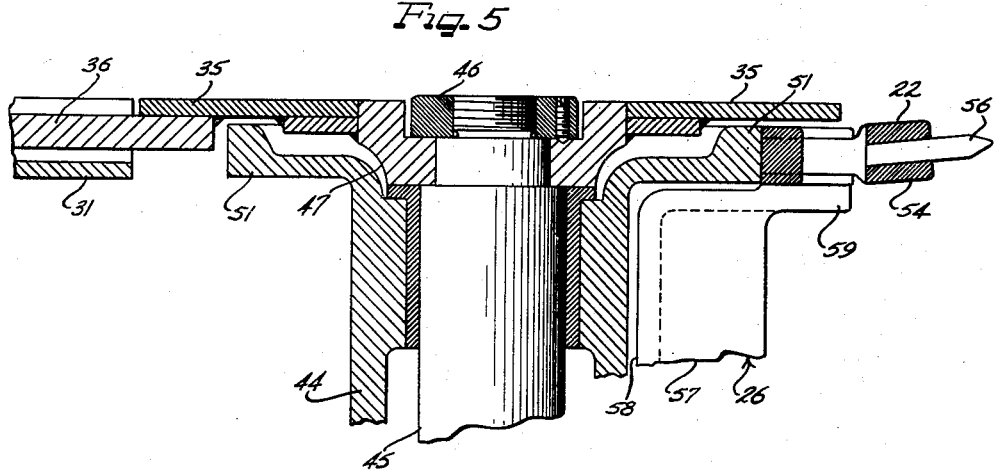
Figure 5 is a fragmentary sectional view taken substantially along line V—V of Figure 1.
Figure 6:
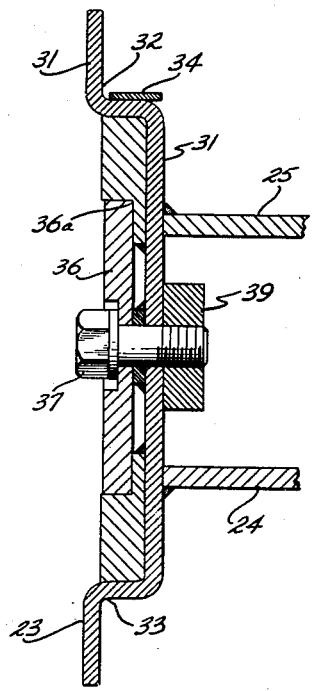
Figure 6 is a fragmentary sectional view taken substantially along line VI—VI of Figure 1.

Referring now in particular to the drawings, the cutting and loading element constructed in accordance with my invention is shown as being embodied in a continuous cutting and loading machine of the laterally spaced continuous tread type. The loading machine includes generally a main frame 10 mounted on and propelled at traveling and feeding speeds by a pair of laterally spaced continuous tread devices 11—11.

An inclined boom 12 having an inclined conveyor 13 movable therealong, herein shown as being a chain and flight type of conveyor, projects forwardly of said main frame and has a ground engaging apron 14 at its forward end, disposed beneath a cutting and loading element 15, projecting forwardly of said boom. The apron 14 extends laterally beneath the gathering and loading element 15 to the receiving end of the conveyor 13 and beyond opposite sides thereof. The inclined boom 12 is pivotally mounted adjacent its rear end on an upright turret 18, mounted on the forward end of the main frame 10, for pivotal movement with respect thereto about a vertical axis and affording a means for swinging the boom 12 and cutting and loading element 15 from side to side.

A discharge conveyor 19 having a receiving end disposed beneath the discharge end of the elevating conveyor 13 extends beyond the rear end of said main frame and may be laterally and vertically adjustable with respect to said main frame for discharging the mined material into mine cars or the like. Hydraulic jacks 20, 20 may be mounted on projecting forward portions 21, 21 of the turret 18 on opposite sides of the boom 12 and may be suitably connected to said boom to elevate said boom and feed the cutting and loading element 15 vertically. Suitable power drive means (not shown) may also be provided to swing said turret and boom from side to side. Other means may be provided to swing the discharge conveyor 19 from side to side and to elevate the discharge end thereof. Said drive means are no part of my present invention, so need not herein be shown or described in detail.

The cutting and loading element 15 includes two laterally spaced cutter chains 22, 22 guided for orbital travel in vertical planes about a pair of laterally spaced cutter bars 23, 23. The cutter bars 23, 23 are connected together by a lower transverse plate 24 and an upper material carrying plate 25, along which flights 26, 26 are moved by the cutter chains 22, 22.

The cutter bars 23, 23 are rigidly mounted on and project forwardly from the forward end of the boom 12 on support structures 27, 27 extending along opposite sides of said boom and secured to the outer side of said cutter bar as by welding. The support structures 27, 27 have housing 28, 28 mounted thereon, intermediate the ends of said structures, and forming bearing supports for a transversely extending chain drive shaft 29. The structures 27, 27 have inwardly extending vertical forward end portions 30, 30 secured to the outsides of chain guide members 31, 31.

Each cutter chain guide member 31 has inwardly facing shouldered guides 32 and 33, extending along its upper and lower portions respectively, along which the cutter chain 22 moves. The upper guide 32 has a wearing strip 34 extending therealong which may be hardened to form a wear resistant track for the chain. A guide plate or cutter head 35 extends forwardly of the guide member 31 and has a tongue 36 extending rearwardly along the outside of the guide member 31 and guided in a channeled guide 36a for movement with respect thereto in longitudinal direction. A cap screw 37 extending through a slotted portion of said tongue and threaded in a boss 39 on the inner side of the guide member 31 is provided to hold said cutter head in adjustment. An adjusting screw 38 threaded in a lug 39 extending outwardly from the tongue 36 is provided to adjustably move the cutter head 35 and vary the tension of the cutter chain 22. The adjusting screw 38 as herein shown has a hexagonal head abutting a lug 40 projecting outwardly from the guide member 31 so that turning movement of said screw will extend the cutter head 35 or permit it to be retracted.

The upper material carrying plate 25 is secured at its outer sides to the guide members 31, 31 as by welding and its upper surface is substantially tangentially of and extends forwardly from a direction-changing roller 43 on the shaft 29 to a position adjacent and substantially tangentially of a direction-changing roller 44 journaled on a transverse shaft 45. The shaft 45 is mounted at its ends in the cutter heads 35, 35 and is secured thereto by nuts 46, 46 threaded on opposite ends thereof and recessed within and engaging bosses 47, 47 within which said shaft is mounted (Figure 5).

Drive sprockets 49—49 are mounted on the transverse shaft 29 inwardly of the bearing housings 28, 28 and mesh with and drive the cutter chains 22, 22. Chain and sprocket drives 50, 50 connected to and driven from the flight conveyor 13 to opposite ends of the shaft 29 are provided to drive said shaft and the cutter chains 22, 22 about the cutter bars 23, 23.

The cutter chains 22, 22 change their direction of travel at the forward end of the cutter bars 23, 23 about flanged rims 51, 51 of the direction-changing roller 44. Said rims are disposed just inwardly of the cutter heads 35, 35 and their outer peripheries are in substantially tangential alignment with the upper and lower guides 32, 32 and 33, 33. The cutter chains 22, 22 are held in laterally spaced relation with respect to each other and in engagement with the peripheries of the flanged rims 51, 51 and in the guides 32, 32 and 34, 34 by means of the flights 26, 26 secured at their opposite ends to said cutter chains, as will hereinafter more clearly appear as this specification proceeds.

The cutter chains 21, 21 may be of any well known form commonly used to cut solid material such as coal, and as herein shown include a plurality of blocks 54—54 pivotally connected together by links 55, 55 and having cutter bits 56, 56 mounted therein and projecting therefrom in the usual manner and set to cut as the cutting and loading element moves upwardly from the floor to the roof of the mine.

Each flight 26, as herein shown, has an advance material moving surface 57 inclined from the bottom thereof at a slight angle in the direction of travel of the flight. The flight 26 also has a bottom surface 58 forming a base for said flight and resting on and movable along the upper material-carrying plate 25 and engaging the rollers 43 and 44 as the cutter chains 22, 22 change their direction at opposite ends of their orbital path of travel. Opposite end portions 59, 59 of the flights 26, 26 extend upwardly from the ends of said flights beyond the upper ends thereof and each end portion 59 forms a link of the cutter chain 22 and is pivotally connected to adjacent ends of certain of the blocks 54, 54 of the associated cutter chain.

A plurality of laterally spaced cutter arms or blocks 64, 64 are herein shown as projecting upwardly from each flight 26 and as being formed integrally therewith. Said blocks may terminate in the same planes as the blocks 54, 54 of the cutter chains 22, 22 and may have cutter bits 65, 65 mounted therein and projecting upwardly therefrom. Each cutter bit 65 is herein shown as having three cutting points, the outer of which cutting points project beyond opposite sides of said blocks to cut clearance therefor. As herein shown, three of said blocks are equally spaced along each flight 26, although it is readily apparent that any number of blocks may be provided, depending upon the spacing between the cutter chains 21, 21 and the size of coal it is desired to cut and break down from the solid.

The means for penetrating and wedging apart and breaking the cores into the kerfs cut by the cutter bits 56, 56 and 65, 65 includes a plurality of breaker wheels 66, 66, herein shown as being mounted on the flights 26, 26, to one side of the cutter bits 65, 65. As shown in Figure 2, the breaker wheels 66, 66 are arranged in staggered relation with respect to each other on each succeeding flight of the cutting and loading element. Thus, one breaker wheel 66 is disposed between the cutter chain 22 and a cutter block 64 while the next breaker wheel on the same flight is spaced two cutter blocks from said first breaker wheel and is mounted between two cutter blocks 64, 64. On the next succeeding flight the breaker wheels may be mounted alternately of the breaker wheels on the flight just mentioned so that the cores left by the cutter chains 22, 22 and the bits 65, 65 are alternately engaged by the breaker wheels 66, 66. This order of arrangement is shown as continuing throughout the cutting and loading element, although it may be understood that more or less breaker wheels may be provided on each flight and that the breaker wheels may be entirely eliminated from some flights, if desired, depending upon the mining conditions and on the hardness and friability of the coal being cut and loaded.

As shown in Figure 4, each cutter block 64 has a boss 67 extending from opposite sides thereof and intermediate the ends thereof. The bosses 67 are apertured and, as herein shown, have a transverse shaft 69 extending therethrough for the length of the flight and mounted at its ends in bosses 70, 70 extending inwardly from opposite end portions 59, 59 of the flight 26. The shaft 69 forms a pivotal connecting means for brackets 71, 71 for the breaker wheels 66, 66. The brackets 71, 71 extend rearwardly of the shaft 69 and are of an open formation to allow the breaker wheels 66, 66 to extend between the sides thereof and have laterally spaced runners 73, 73 spaced rearwardly of the blocks 64, 64 and slidably engageable with the plate 25. Bosses 73, 73 are herein shown as being formed integrally with and projecting upwardly from the top sides of the runners 72, 72 and as having a transverse shaft 74 mounted therein. The breaker wheel 66 is rotatably mounted on the transverse shaft 74 on bearings 76, 76.

The breaker wheels 66, 66 are of such a diameter as to extend beyond the upper margins of cutter blocks 54, 54 and 64, 64 a distance sufficient to penetrate the coal left between said blocks and to be rotated by engagement with the coal and at the same time penetrate the coal and spread or wedge it apart along its cleavage planes into the kerfs on opposite sides of said breaker wheels, thus causing the coal to drop onto the plate 25 and be carried therealong by the flights 26, 26 for discharge onto the conveyor 13.

It should here be noted that the runners 72, 72 are of such a length as to come into engagement with the next succeeding flight 26 as said flight moves about the direction-changing roller 44 and to react thereagainst as the breaker wheels 66, 66 round the roller 44 and come into engagement with the coal. A stop 79 projects forwardly from each bracket 71 to engage the top of the associated flight 26 and prevent said bracket from pivoting downwardly when traveling toward the coal face.

The breaker wheels 66, 66 may be of several forms but are preferably of a wedge-shaped formation having a substantially V-shaped engaging face converging toward a point at its periphery to penetrate and wedge the coal into the kerfs on opposite sides thereof. As herein shown, the peripheries of the breaker wheels 66, 66 are serrated to provide a plurality of spaced apart wedge-shaped points adapted to engage and penetrate and wedge the coal along its cleavage planes into the kerfs on opposite sides thereof.

With the type of machine shown herein, the cutting and loading element 15 may be fed into the coal face along the ground by means of the laterally spaced continuous tread devices 11, 11 while cutter chains and flights are orbitally traveling about the cutter bars 23, 23. The cutter bars 23, 23 are usually fed along the ground into the coal a depth of from 18 to 24 inches and may then be elevated by pivotal movement of the boom 12 about its axis of pivotal connection to the turret 18, effected by the hydraulic jacks 20, 20, it being understood that during this elevating movement of said cutter bars the cutter chains 22, 22 are continuously traveling thereabout and that the cutter bits 56, 56 with cutter bits 65, 65 cut a plurality of relatively widely spaced kerfs in the coal face from the bottom to the top thereof. During the sumping operation and as the cutter bars 23, 23 move upwardly during the vertical cutting operation, the breaker wheels 66, 66 will come into engagement with the coal face between the kerfs cut by the cutter chains 22, 22 and the cutter bits 65, 65 to penetrate the cores and spread or wedge them apart along the cleavage planes of the coal into the kerfs on opposite sides of said breaker wheels, where it will fall onto the plate 21 for discharge onto the conveyor 13. When the cutting element reaches its upward extremity of travel, which is usually at or adjacent the mine roof, the machine may be backed away from the face by reverse operation of the continuous tread devices 11, 11, the remaining coal along the mine roof being cut and taken down during this backing up or withdrawing operation. The cutting and loading element may then be moved or positioned to cut another block of coal from the coal face from the mine bottom to the mine roof.

The cutting and loading element 15 may be positioned to mine the second block by turning the turret 18 about its axis of pivotal connection to the main frame 10 to swing the boom laterally, it being understood that the machine may be positioned near the center of the working place during such cutting and loading operations. These sumping, vertical cutting, withdrawing and positioning operations may be repeated across the entire coal face until all of the coal has been mined from the coal face to the required depth without the usual cutting, shooting and loading operations.

It may be seen from the foregoing that a novel form of cutting element has been provided for the continuous cutting and loading of coal which, instead of cutting a plurality of closely spaced kerfs, cuts a plurality of kerfs spaced rather widely apart and then penetrates and wedges the cores between the kerfs into the kerfs, along the cleavage planes of the coal so as to provide a cutting and loading element which will continuously cut and load a much higher percentage of coarse or lump coal than has heretofore been possible, with little if any increase in power consumption.

It will be understood that modifications and variations may be effected without departing from the scope of the novel concepts of the present invention.

I claim as my invention:

1. In a continuous cutting and loading element, two spaced apart cutter bit carrying cutter chains guided for orbital travel in parallel spaced vertical planes, a material carrying plate spacing said cutter chains apart, a material moving flight connected with said cutter chains and moved along said plate thereby, a rotatable core breaker operatively connected with said flight for movement therewith, said core breaker having a converging serrated substantially wedge-shaped engaging surface adapted to engage, wedge apart, and break down the core between the kerfs cut by said cutter chains.

2. A continuous cutting and loading element including two parallel spaced cutter bars having cutter bit carrying chains guided for orbital travel thereabout, a material carrying plate disposed between said bars and a flight movable along said plate and connected with said chains, a bracket connected to said flight and extending rearwardly thereof, a rotatable core breaker mounted in said bracket and having a converging substantially wedge-shaped serrated material-engaging surface, the periphery of which is spaced inwardly of the cutting ends of said cutter bits to penetrate and wedge apart and break down the core between the kerfs cut by said cutter chains.

3. A continuous cutting and loading element including two parallel spaced cutter bars having cutter bit carrying cutter chains guided for orbital travel thereabout, a material-carrying plate spacing said bars apart and a flight movable along said plate and connected between said chains, a cutter block projecting from said flight having a cutter bit projecting therefrom, a bracket member pivotally connected to said flight to one side of said cutter block and mounted for slidable movement along said plate, a core breaker rotatably carried by said bracket and having a converging substantially wedge-shaped material engaging periphery spaced inwardly of the cutting ends of said cutter bits, and means limiting pivotal movement of said bracket when changing its direction at the forward ends of said cutter bars and maintaining said core breaker in position to penetrate the material between the kerfs cut thereby and wedge it apart along its cleavage planes onto said plate.

4. In a cutting element adapted for the continuous cutting and loading of coal and the like, two parallel spaced cutter bars having cutter bit carrying chains guided for orbital travel thereabout, a plate spacing said cutter bars apart, and flights connected with said chains and movable therewith along said plate and having a plurality of blocks projecting therefrom having cutter bits carried thereby and arranged to cut kerfs intermediate the kerfs cut by said cutter chains, the improvements comprising a plurality of brackets pivoted to said flights for movement therewith and having breaker wheels rotatably carried thereby, said wheels each having converging serrated engaging faces engageable with the uncut material between the kerfs cut by said cutter bits, and means for limiting pivotal movement of said brackets when changing their directions of travel at the forward ends of said cutter bars and maintaining said core breakers in position to penetrate and split and wedge the material down along its cleavage planes into the path of said flights.

5. In a cutting element adapted for the continuous cutting and loading of coal and the like, two parallel spaced cutter bars having cutter bit carrying cutter chains guided for orbital travel thereabout, a material-carrying plate disposed between said cutter bars, flights connected with said chains for movement along said plate, direction changing devices at opposite ends of said bars and plates about which said chains and flights turn, and a plurality of cutter bits carried by said flights at points spaced laterally therealong, the improvements comprising a plurality of brackets transversely pivoted to said flights and rotatable breaker wheels rotatably carried by said brackets, said breaker wheels each having converging wedge-shaped engaging peripheries engageable with the uncut material between the kerfs cut by said cutter bits and penetrate and wedge it along the cleavage planes of the material into the path of said flights, and said brackets being of sufficient length to engage the next succeeding flights during travel about the forward of said direction-changing devices, said next succeeding flight providing a reaction means for the next preceding bracket during the wedge and breaking operation when changing its direction of travel.

6. In a cutting element adapted for the continuous cutting and loading of coal and the like, two parallel spaced cutter bars having a plurality of cutter bit carrying chains guided for orbital travel thereabout, a material-carrying plate disposed between said cutter bars, material-moving flights connected with said cutter chains for movement along said plate, direction-changing devices at opposite ends of said plate about which said chains and flights turn, and a plurality of cutter bits carried by said flights at laterally spaced points therealong, the improvements comprising a plurality of brackets trailing said flights and transversely pivoted thereto to one side of said cutter chains, each of said brackets having runners supporting said brackets while moving along said plate and a rotatable breaker wheel carried thereby, said runners limiting pivotal movement of said brackets and maintaining said core breakers in core breaking positions when turning about said direction changing devices and said breaker wheels each having converging wedge-shaped engaging faces engageable with the uncut material between the kerfs cut by said cutter bits and penetrate and wedge it down along its cleavage planes into the path of said flights.

7. In a cutting element adapted for the continuous cutting and loading of coal and the like, two parallel spaced cutter bars having a plurality of cutter bit carrying chains guided for orbital travel thereabout, a material-carrying plate disposed between said cutter bars, material-moving flights connected with said chains for movement along said plate, direction-changing devices at the forward ends of said cutter bars about which said chains and flights turn, and a plurality of cutter bits carried by said flights at laterally spaced points therealong, the improvement comprising a plurality of brackets transversely pivoted to said flights and extending rearwardly therefrom to one side of said cutter bits and chains, each of said brackets having a runner supporting said bracket while moving along said plate and a rotatable breaker wheel carried thereby, said breaker wheels each having a converging wedge-shaped engaging face engageable with the uncut material between the kerfs cut by said cutter bits and penetrate and wedge it down along its cleavage planes into the path of said flights, and said runners being of sufficient length to engage the next succeeding flights during movement of said brackets about the forward of said direction-changing devices, said next succeeding flight affording a reaction means for the next preceding bracket during the wedging and breaking operation and during travel thereof about the forward of said direction-changing devices.

8. A continuous cutting and loading element including two spaced apart orbitally guided vertically disposed cutter bit carrying cutter chains, a plurality of parallel spaced flights connected between said cutter chains for travel therewith, a direction changing idler at the forward end of said cutting and loading element, about which said flights turn, brackets pivotally connected with and trailing said flights, and rotatable breaker wheels carried thereby for engagement with the face of the core between the kerfs cut by said cutter bits, for penetrating and wedging the cores laterally toward said kerfs, said brackets normally being spaced in advance of the next succeeding flight during orbital travel of said flights, but being sufficiently long to engage and be supported by and react against the next succeeding flight during travel about said direction changing idler during the operation of penetrating and breaking the face of the core.

9. A continuous cutting and loading element including two parallel spaced cutter bars disposed in vertical planes and having cutter bit carrying chains guided for orbital travel thereabout, parallel spaced flights connected with said cutter chains for movement therewith, a plurality of laterally spaced blocks projecting from said flights and having cutter bits carried thereby and positioned to cut kerfs intermediate the kerfs cut by said cutter chains, a plurality of brackets transversely pivoted to said flights between said cutter bits and movable therewith in trailing relation with respect to said blocks and bits, means limiting pivotal movement of said brackets, and a breaker wheel rotatably mounted in each of said brackets in trailing relation with respect to the blocks projecting from the associated flight, said breaker wheel having a substantially wedge-shaped engaging face converging toward its periphery and maintained by said brackets in position to engage the face of the coal in the space between the kerfs cut by said cutter bits to penetrate and wedge the coal down into the kerfs cut by said bits.

10. A continuous cutting and loading element comprising two parallel spaced cutter bars having cutter bit carrying cutter chains guided for orbital travel thereabout, parallel spaced flights connected with said chains inwardly of the peripheries of said bars for movement with said chains, a direction changing idler at the forward end of said cutting and loading element about which said flights turn, brackets pivotally connected with and trailing said flights, and rotatable breaker wheels mounted in said brackets for engagement with the cores between the kerfs cut by said cutter bits, for penetrating and wedging the cores laterally toward said kerfs, said brackets normally being spaced in advance of the next succeeding flight during orbital travel thereof, but being sufficiently long to engage and be supported by and react against the next succeeding flight during travel about said direction changing idler in the operation of penetrating and breaking the face of the core.

FRANK CARTLIDGE.

References Cited in the file of this patent

UNITED STATES PATENTS

| Number | Name | Date |
|---|---|---|
| 981,201 | Kuhn | Jan. 10, 1911 |
| 1,404,835 | Christine | Jan. 31, 1922 |
| 2,269,781 | Osgood | Jan. 13, 1942 |
| 2,287,230 | Cartlidge | June 23, 1942 |
| 2,368,863 | Miller | Feb. 6, 1945 |
| 2,415,217 | Osgood | Feb. 4, 1947 |